United States Patent Office 3,271,441
Patented Sept. 6, 1966

3,271,441
PROCESS FOR PREPARING FLUOROALKYL SUBSTITUTED AROMATIC COMPOUNDS
Neal O. Brace, Wilmington, Del., assignor to E. I. du Pont de Nemours and Company, Wilmington, Del., a corporation of Delaware
No Drawing. Filed June 18, 1962, Ser. No. 203,392
2 Claims. (Cl. 260—476)

This invention is directed to a method for preparing polyfluoroalkyl substituted aromatic compounds, and more particularly this invention is directed to a method for preparing polyfluoroalkyl substituted aromatic compounds by reacting a polyfluoroalkyl iodide with an aromatic compound in the presence of a free radical generating compound.

This invention is also directed to new and novel perfluoroalkyl substituted aromatic compounds prepared by reaction of a perfluoroalkyl iodide with an aromatic compound in the presence of a free radical generating compound.

A number of polyfluoroalkyl substituted aromatic compounds are known but convenient and economical methods for preparing these types of compounds are not available. British Patent 840,725 describes a process for forming perfluoroalkyl derivatives of aromatic compounds by heating one mole of the aromatic compound with two moles of a perfluoroalkyl iodide. The products are the perfluoroalkyl substituted aromatic compound, the hydroperfluoroalkane and iodine according to the equation $$AR—H + 2R_fI \rightarrow AR—R_f + R_fH + I_2$$

wherein AR—H and $R_f$ represent the aromatic compound and perfluoroalkyl radical respectively.

Thus this process wastes one mole of perfluoroalkyl iodide in forming $R_fH$ compound. U.S. Patent 2,957,031 describes a process for reacting perfluoroacid halides with aromatic compounds in the presence of nickel carbonyl whereby the perfluoroalkyl substituted aromatic compound is obtained. The highly toxic nature of nickel carbonyl makes this process undesirable in commercial practice.

It is, therefore, an object of the present invention to provide a novel method for preparing polyfluoroalkyl substituted aromatic compounds.

It is another object of the present invention to provide a novel method which utilizes polyfluoroalkyl iodides as starting materials.

It is still another object of the present invention to provide a novel method which is not wasteful of polyfluoroalkyl iodide and which does not require the use of highly toxic reactants.

It is still another object of this invention to provide new and useful polyfluoroalkyl substituted aromatic compounds.

These and other objects will become apparent from the following description and claims.

More specifically, the present invention is directed to a process for preparing polyfluoroalkyl substituted aromatic compounds, which process comprises heating together a polyfluoroalkyl iodide, an aromatic compound containing at least one hydrogen attached to the aromatic nucleus and a free radical generating compound, and recovering the product polyfluoroalkyl substituted aromatic compound from the reaction mixture.

The present invention is also directed to new and useful polyfluoroalkyl substituted aromatic compounds prepared by the process hereinbefore described.

In its broadest aspects, the present process consists of heating a polyfluoroalkyl iodide $XR_fI$, an aromatic compound containing at least one nuclear hydrogen AR—H and a free radical generating compound and obtaining the polyfluoroalkyl substituted aromatic compound as the major reaction product. The reaction involved seems to be (where R—R represents a free radical generating compound):

$$XR_fI + AR—H + R—R \rightarrow XR_f—AR + RH + RI$$

On this basis, the most efficient and preferred form of the process results from the use of equimolar amounts of polyfluoroalkyl iodide and free radical generating compound and at least an equimolar amount of the aromatic compound. In many cases, it is preferred to use an excess of aromatic compound which acts as a diluent to insure more nearly complete use of the exepnsive polyfluoroalkyl iodide.

The polyfluoroalkyl iodides used in this invention are compounds of formula $R_xI$. The group $R_x$, in turn, has the formula $X—R_f—$ where $R_f$ is a perfluoroalkylene group and X is chosen from fluorine, hydrogen, chlorine and bromine. The preferred iodides are those where X is fluorine, i.e. perfluoroalkyl iodides. A large number of perfluoroalkyl iodides are known to the art, both open chain and cyclic. Some typical examples are $CF_3(CF_2)_nI$ where $n$ is zero or greater, $CF_3CFI(CF_2)_nCF_3$, $n$ being the same as above, $CF_3(CF_2)_n(CF_2CFY)_mI$ where $n$ is the same as above, Y is fluorine or $CF_3$— and $m$ is one or greater and many others such as the perfluoroalkyl iodides as described in U.S. 2,992,279, U.S. 2,975,220, French Patent 1,223,259, and the like. Polyfluoroalkyl iodides $X—R_f—I$ are known where X is hydrogen, chlorine and bromine. Some examples are $H(CF_2)_pI$, $Cl(CF_2)_pI$ and $Br(CF_2)_pI$ where $p$ is greater than one. Other examples of polyfluoroalkyl iodides include $ClCF_2(CF_2CFY)_mI$ where Y is again fluorine or $CF_3$— and $m$ is one or greater (as described in U.S. 2,992,279) and $Cl(CF_2CFY_m)I$ (as described in U.S. 2,975,220). In general, if X is other than fluorine, the X group is attached to a carbon other than that bearing the iodine.

The aromatic compounds used in the present process must contain at least one hydrogen attached to the aromatic nucleus. These compounds may be represented by the formula $H—AR'(Y)_b$ wherein each Y is a substituent chosen from hydrogen, halogen, hydroxyl, alkoxyl, acyloxy, carboxyl, carboalkoxy, acyl, alkyl, chloroalkyl, bromoalkyl, aryl, cyano, sulfonyl, cyanoalkyl, carboxyalkyl, carboalkoxyalkyl, arylalkyl and sulfonylalkyl groups. Alkyl substituents on the aromatic nucleus are preferably free of hydroxyl and keto groups and iodide atoms. The aromatic nucleus may be derived from any aromatic compound. Preferably it is derived from aromatic hydrocarbons such as benzene, naphthalene, anthracene, phenanthrene and the like. Less preferably, it may be derived from pyridine, pyrimidine, pyridazine, pyrozine, quinoline, isoquinoline, cinnoline, quinazoline, quinooxaline, phthalazine, the fused pyridopyridines and the like. The preferred starting materials are those where $b$ in the formula above is zero or one for substituents other than hydrogen, i.e. monosubstituted or unsubstituted aromatic compounds.

Representative examples of species of aromatic compounds useful as starting materials in the present invention include: aromatic hydrocarbons such as benzene, naphthalene, anthracene, phenanthrene, diphenyl and chrysene; alkyl substituted hydrocarbons such as toluene, the xylenes, mesitylene, durene, diphenylmethane, methylnaphthalene, methylphenanthrene, methylanthracene and tetralin; alkoxy hydrocarbons such as anisole, phenetole and methoxynaphthalene; halohydrocarbons such as chlorobenzene, bromobenzene, iodobenzene, chloronaphthalene, dichlorobenzene and chlorotoluene; hydroxyhydrocarbons such as phenol, naphthol and cresol; acids such as benzoic acid, naphthoic acid, toluic acid, the phthalic acids and the naphthalic acids; anhydrides such as phthalic anhydride and naphthalic anhydride; esters such as methyl or ethyl benzoate, toluate, phthalate, naphthoate, phenylacetate and naphthylacetate; acyl compounds such as acetophenone, acetylnaphthalene, propiophenone and benzophenone; nitriles such as benzonitrile, phthalonitrile and phenylacetonitrile; haloalkyl derivatives such as benzyl chloride, 2-bromoethylbenzene and trifluoromethylbenzene; sulfonic acids such as benzenesulfonic acid, naphthalenesulfonic acid and naphthalenedisulfonic acid; other alkyl derivatives such as phenylmethanesulfonic acid, phenylacetic acid and phenol type esters such as phenyl acetate and naphthyl acetate. Substituted heterocyclic compounds such as the methylpyridines and methylquinolines, the pyridine and quinoline carboxylic acids and certain dyestuffs such as copper phthalocyanine, thioindigo (C.I. 73300), pyranthrone (C.I. 59700), violanthrone (C.I. 59800) and dichloroisoviolanthrone (C.I. 60010) are also useful. (C.I.—Colour Index.)

The free radical generating compound may be any substance which forms free radicals of sufficient reactivity under the influence of heat. By sufficient reactivity it is meant merely that the radical formed must not be one of those highly stabilized species which form readily but which do not react readily with other substances, for example, the benzyl radical. Preferably, the free radical generating compound is also soluble in the reaction medium. The preferred compounds are the aromatic acyl peroxides such as benzoyl peroxide, the alkyl peroxides of sufficient stability for easy handling such as di-tert-butyl peroxide, the alkyl azo compounds such as $\alpha,\alpha'$-azo-bis(isobutyronitrile), $a,a'$-azobis(methylvaleronitrile) and $\alpha,\alpha'$-azobis(dimethylvaleronitrile) and the like, and alkyl azo amidines such as $\alpha,\alpha'$-azobis(isobutyramidine hydrochloride) and the like. The preferred free radical generating compound is di-tert-butyl peroxide. As noted above, the free radical generating compound should preferably be used in equimolar amounts with the polyfluoroalkyl iodide. An excess of free radical generating compound leads to no useful results. A deficiency merely means that some of the polyfluoroalkyl iodide will not be consumed and will be lost unless this expensive starting material is recovered from the reaction mixtures. Less than equimolar amounts can be used, however; it merely means that lower conversions and perhaps lower yields will be obtained.

The reaction temperature varies generally with the free radical generating compound being used. In general terms, it may vary from about 80° to about 190° C. Aromatic acyl peroxides such as benzoyl peroxide and the aliphatic azo compounds cited above are used at from 80° to about 120° C. Di-tert-butyl peroxide and equivalents are used at from 120° to about 180°. The preferred temperature range is 130° to 150° C. with the preferred di-tert-butyl peroxide.

The reaction pressure is dependent on other factors of the process and is not a primary variable. If all of the reactants and products have boiling points above the chosen reaction temperature, the process may be carried out at atmospheric pressure. If, however, one or more of the reactants or products has a boiling point at or below the reaction temperature, then it is more convenient to use a sealed system. Refrigerated condensers can be used but are less convenient. The pressure in a sealed system will be autogenous in a batch system. If a continuous system is used, where reactants are pumped continuously into a liquid full reaction vessel, the pressure will be controlled at some point above the vapor pressure of the system at the chosen reaction temperature. In general, the use of a sealed reaction system offers no advantage other than retaining materials in the system. Pressure has no effect on the rate of the reaction or the results obtained.

The major products of this invention are of formula X—$R_f$—AR'—(Y)$_b$, i.e. polyfluoroalkyl substituted aromatic compounds. The preferred products are those where X is fluorine and only one of the Y groups is other than hydrogen. Small amounts of disubstituted products (X—$R_f$—)$_2$AR'(Y)$_{b-1}$ are also obtained in some cases. When the products are obtained from a monosubstituted benzene, they are generally primarily the ortho and para isomers with only small amounts of the meta isomers formed. Similar directive effects seem to operate in reactions with monosubstituted derivatives of other aromatic systems such as naphthalene.

The products of this invention have various utilities depending on their nature. Those derived from unsubstituted aromatic systems, for example, $C_4F_9$-$C_6H_5$, are useful surfactants for forming oil-fluorocarbon emulsions. They are also useful as stable fluids, particularly those of higher boiling point which are liquid, for example, $C_7F_{15}$-naphthalene. The compositions where the aromatic nucleus carries a halogen, alkyl, aryl, arylalkyl, chloroalkyl and bromoalkyl are also useful as surfactants and stable fluids. The products where the aromatic nucleus carries one or more alkoxy, acyloxy, carboalkoxy, cyano, cyanoalkyl and carboalkoxyalkyl substituents are also useful as stable fluids.

The products of this invention are also useful as intermediates for conversion to hydroxy, carboxy and alkylcarboxy derivatives by hydrolysis. Those products bearing carboxyl and sulfonyl groups are useful as surface active agents and form oil repellent coatings on surfaces.

The new and novel compounds formed by the heretofore described process and having the formula $$R_f C_6 H_4 CO_2 R$$

wherein R is hydrogen or lower alkyl, are useful as intermediates and surface active agents. The esters, where R is a lower alkyl, are useful intermediates for preparing the corresponding acids. The corresponding acids of these esters are useful as surface active agents and for imparting oil repellent coatings on surfaces. The corresponding acids may also be used for treating metals as described in U.S. 3,012,917. For example, the acids $R_f C_6 H_4 CO_2 H$ of this invention may be substituted for 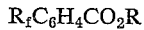$F(CF_2)_{20}CO_2H$ in Example VII of U.S. 3,012,917.

The use of perfluoroalkyl substituted aromatic hydrocarbons as surface active agents is described in British Patent 840,725, forming emulsions between oils and fluorocarbons. The use of these compounds as stable oils, and the stability tests thereof, is described in U.S. 2,957,031. The use of products containing sulfonic or carboxylic acid groups as surfactants and emulsifying agents in the polymerization of tetrafluoroethylene is also described in U.S. 2,957,031. The use of perfluoroalkyl substituted aromatic dicarboxylic acids or anhydrides is described in British Patent 840,725 for preparing alkyd type resins, for example the reaction of perfluoroheptylphthalic anhydride with glycerol in the mole ratio of 3:2 gives a resin of unusual properties. The esters and nitrile products are easily hydrolyzed to the corresponding acids by well known methods. Dinitriles such as perfluoroalkyl derivatives of phthalonitrile are readily converted to phthalocyanines by heating in the presence of metals such as copper. This and other dyestuffs mentioned are useful for dyeing polytetrafluoroethylene, according to British Patent 840,725. Perfluoroalkyl derivatives of alkyl, alkoxy, acyl or halogen substituted aromatic compounds are readily converted to surface active agents by sulfonation with fuming sulfuric acid, forming the sulfonic acids. In addition, in a manner similar to the method hereinbefore described for using the benzoic acids, the sulfonic acids of the present invention may also be used for treating metals as described in U.S. 3,012,917. The perfluoroalkyl derivatives of hydroxyaromatic compounds may also be coupled with diazonium compounds such as diazotized 1-amino-4-naphthalenesulfonic acid to form dyestuffs. The heterocyclic compounds find many of the same uses as the corresponding hydrocarbon derivatives as hereinbefore described although they are not sulfonated as readily. However, the heterocyclic compounds react with alkyl halides or sulfates to form quaternary compounds, i.e. reaction with methyl chloride or methyl sulfate. These quaternary compounds are useful surface active and emulsification agents.

Representative examples illustrating the present invention follow. All parts are by weight.

*Example I*

A mixture of 78 parts of benzene (1 mole), 45 parts of 1-iodoperfluorobutane (0.13 mole) and 14.6 parts of di-tert-butyl peroxide (0.10 mole) was heated for 10 hours at 140° C. in a pressure vessel lined with Hastelloy-C. The product was then poured on ice and the heavy oil layer (114 parts, 86% material recovery) was collected and dried. Analysis of the product by vapor phase chromatography indicated that the product was 13 mole percent 1-iodoperfluorobutane, 67 mole percent benzene, 16 mole percent perfluorobutylbenzene and 3.6 mole percent higher substituted products. The yield of perfluorobutylbenzene was 87% based on converted perfluorobutyl iodide (this analysis was normalized to eliminate the reaction products of the peroxide).

Fractional distillation of the product gave 17.6 parts of a methyl iodide, acetone and perfluorobutyl iodide mixture, 69.3 parts of benzene and the remainder perfluorobutylbenzenes, 83.3 mole percent of which was perfluorobutylbenzene. Perfluorobutylbenzene, B.P. 88° C. at 100 mm., was separated by further fractionation.

*Analysis.*—Calcd. for $C_{10}F_9H_5$: C, 40.6; H, 1.7; F, 57.5. Found: C, 39.9; H, 1.8; F, 56.2.

The remainder of the product was polysubstituted perfluorobutylbenzenes which was not further characterized.

The corresponding perfluoropropylbenzene, prepared from n-perfluoropropyl iodide and benzene as above, has a boiling point of 128° C. and di-perfluoropropylbenzene has a boiling point of 145° C. Perfluoroheptylbenzene has a boiling point of 200° C. and di-perfluoroheptylbenzene a boiling point of 270° C.; these compounds being prepared from benzene and n-perfluoroheptyl iodide as described above.

*Example II*

A mixture of 66.8 parts of anisole (0.62 mole), 150 parts of perfluoroethyl iodide (0.61 mole) and 89 parts of di-tert-butyl peroxide (0.61 mole) was heated in a pressure vessel for 8 hours at 140° C. The product (300 parts, 99% recovery) was fractionally distilled giving 160.8 parts of low boiling material containing perfluoroethyl iodide, methyl iodide and acetone and 126.2 parts of higher boiling products. Fractionation of the latter material gave 23.6 parts of anisole (35% recovery), a small amount of phenol, and 56.0 parts (42% conversion, 65% yield) of the 3 isomers of pentafluoroethylanisole, B.P. 110° C. at 101 mm. The remainder was tars and polysubstituted anisoles. Of the 56 parts of pentafluoroethylanisoles, 11 parts were meta-pentafluoroethylanisole, $n_D^{25}$ 1.4172, and 45 parts were ortho and para-pentafluoroethylanisoles, ortho isomer, $n_D^{25}$ 1.4226, para isomer, $n_D^{25}$ 1.4209. All isomers had the same analysis.

Calcd. for $C_9F_5H_7O$: C, 47.8; H, 3.12; F, 42.1. Found: C, 47.9; H, 3.1; F, 42.0.

The corresponding perfluoropropyl derivatives, prepared from anisole and perfluoropropyl iodide as above, has a boiling point of 96° C. at 40 mm.

*Example III*

A mixture of 90 parts of 1-iodoperfluorobutane (0.262 mole), 28 parts of methyl benzoate (0.206 mole) and 29.2 parts of di-tert-butyl peroxide was heated at 140° C. for 10 hours in a pressure vessel. The vessel was vented at room temperature into a refrigerated receiver; 18 parts of low boiling material was collected having the following analysis by mass spectra (in mole percent: methyl iodide 48%, tert-butyl alcohol 1%, acetone 25% and isobutylene 7% with the remainder being unidentified. The residue (122 parts, total recovery 95%) was fractionally distilled giving 49.1 parts of lower boiling material which contained methyl iodide and acetone, 13.3 parts of methyl benzoate (52.2% conversion), 26.0 parts of the isomers of methyl perfluorobutylbenzoate, B.P. 99–103° C. at 9.5 mm. (67% yield) and 29.8 parts of higher boiling material.

*Analysis.*—Calcd. for $C_{12}H_7F_9O_2$: C, 40.7; H, 2.0. Found: C, 40.7; H, 2.0.

A portion (10 parts) of the isomeric methyl perfluorobutylbenzoates and 5.6 parts of potassium hydroxide was heated in 95% ethanol solution for 3 hours at 70–80° C. The solution was diluted with a six-fold volume of water and acidified. The solids which precipitated were collected, 9.6 parts (100%), M.P. 85–157° C. Fractional crystallization from benzene ultimately gave para-perfluorobutylbenzoic acid, M.P. 168° C., (pKa, 50% ethanol, 4.68) and ortho-perfluorobutylbenzoic acid, M.P. 87–88° C., (pKa, 50% ethanol, 4.68). Metaperfluorobutylbenzoic acid appears to be present in traces. The yield of para isomer was 66% and the ortho isomer 16%.

*Example IV*

A mixture of 13.6 parts of methyl benzoate (0.1 mole) and 50 parts of 1-iodoperfluoroheptane (0.1 mole) was heated at 135–139° C. while 14.6 parts of di-tert-butyl peroxide (0.1 mole) was added over a two hour period at atmospheric pressure. The reaction mixture was then heated for a further 18 hours. Fractional distillation of the product gave 4.5 parts of unreacted methyl benzoate, 17.4 parts of methyl perfluoroheptylbenzoate isomers (35% conversion), B.P. 136° C. at 10 mm. and 92–99° C. at 0.7 mm., 3.7 parts of a mixture of methyl di-perfluoroheptylbenzoate isomers (4.2% conversion), B.P. 141° C. at 0.7 mm. and 11.4 parts of a mixture of perfluoroalkylated condensed aromatic compounds of undetermined structure, B.P. 195–240° C. at 1.0–2.5 mm., and 3.8 parts of residue.

Analysis of the methyl perfluoroheptylbenzoate isomers gave the following results:

Calcd. for $C_{15}F_{15}H_7O_2$: C, 35.8; H, 1.4; F, 56.5; Saponification No., 111.2. Found: C, 35.8; H, 1.6; F, 55.6; Saponification No., 110.

Five parts of the methyl perfluoroheptylbenzoate mixture and 25 parts of 10% alcoholic potassium hydroxide were heated for 3 hours at steam temperature. The resulting mixture was poured into 200 parts of water and acidified with concentrated hydrochloric acid. The solid precipitate was collected, washed with water and dried, 4.8 parts (100%), M.P. 170–190° C.

The solid product was dissolved in a refluxing mixture of 87.9 parts of benzene and 10.49 parts of acetic acid. Cooling gave fine white needles (2.9 parts) of para-perfluoroheptylbenzoic acid, M.P. 195–196° C. pKa (in 50% ethanol) 4.84. The pure ortho-perfluoroheptylbenzoic acid, M.P. 130.5–131.5° C., was obtained from the filtrate, pKa 4.90. The meta isomer, if present, was not isolated.

*Example V*

A mixture of 123 parts of perfluoroethyl iodide (0.5 mole), 68 parts of methyl benzoate (0.5 mole) and 73 parts of di-tert-butyl peroxide (0.5 mole) was heated for 8 hours at 140° C. in a pressure vessel. The liquid product (254 parts) was distilled giving 32 parts of methyl benzoate, 120.8 parts of more volatile materials and 39.6 parts (31% conversion) of isomeric methyl perfluoroethylbenzoates. The isomers could not be separated by distillation but were partially separated by gas chromatography giving the metal and para isomers of methyl perfluoroethylbenzoate. Hydrolysis gave the isomeric perfluoroethylbenzoic acids: para-perfluoroethylbenzoic acid, 67%, M.P. 155–156.5°, pKa=4.80 and presumably meta-perfluoroethylbenzoic acid, 21% M.P. 100–102°, pKa, 5.04.

*Example VI*

A mixture of 336 parts of perfluoroheptyl iodide (0.67 mole) and 49.6 parts of chlorobenzene was heated at 135–139° C. at atmospheric pressure while 14.6 parts of di-tert-butyl peroxide (0.1 mole) was added over a two hour period. The mixture was heated for a further 18 hours. The reaction mixture was then fractionally distilled, giving 19.2 parts of low boiling material, B.P. 57–100° C., 19.4 parts of a complex mixture containing perfluoroheptyl iodide, B.P. 105–128.5° C., 20 parts of chlorobenzene, B.P. 131° C., and 22.1 parts of higher boiling materials. Refractionation of 20 parts of the higher boiling material gave 12.9 parts of perfluoroheptylchlorobenzene isomers, B.P. 100–102° C. at 11 mm., $n_D^{25}$ 1.3763, and two higher boiling materials.

Analysis of perfluoroheptylchlorobenzene gave the following:

Calcd. for $C_{13}F_{15}H_4Cl$: C, 32.5; H, 0.8; Cl, 7.4. Found: C, 32.4; H, 0.9; Cl, 7.6.

The conversion of chlorobenzene was 59.7%. The yield of perfluoroheptylchlorobenzene, based on perfluoroheptyl iodide charged, was 40%. The yield, based on perfluoroheptyl iodide converted, was 60%, the remainder being di-perfluoroheptylchlorobenzenes and condensed perfluoroheptyl polyaromatic compounds.

The corresponding perfluoroheptylbromobenzene has a boiling point of 237° C. and the corresponding perfluoroheptyliodobenzene has a boiling point of 253° C.; these compounds being prepared by substituting bromo and iodobenzene chlorobenzene in the above-described procedure.

*Example VII*

A mixture of 25 parts of perfluoroethyl iodide (0.1 mole), 10.3 parts of benzonitrile (0.1 mole) and 14.6 parts of di-tert-butyl peroxide (0.1 mole) was heated in a sealed vessel for 10 hours at 130° C. On cooling, 6.0 parts of gaseous products and 45.0 parts of liquid products were obtained. The gaseous material contained, by gas chromatographic analysis, 17.6 mole percent perfluoroethyl iodide, 43.6 mole per methyl iodide, 9.9 mole percent pentafluoroethane, 12.7 mole percent tert-butyl alcohol, 4.4 mole percent di-tert-butyl peroxide and 9.6 mole percent acetone. The liquid fraction contained the following: Acetone 17.7 mole percent, methyl iodide 0.05 mole percent, tertbutyl alcohol 13.7 mole percent, di-tert-butyl peroxide 9.2 mole percent, perfluoroethylbenzonitrile isomers 2.6, 3.5 and 11.0 mole percent and benzonitrile 20.4 mole percent. The conversion of benzonitrile was 45.6%; the yield based on benzonitrile was 100%, while the yield based on perfluoroethyl iodide was 95.4%, due to formation of pentafluoroethane. The mixture of isomers of perfluoroethylbenzonitrile has a boiling point of 86° C. at 21 mm. The para, ortho and meta isomers of perfluoroethylbenzonitrile apparently occurred in the ratio of 11:3.5:2.6. The isomers were not separated.

*Analysis.*—Calcd. for $C_9F_5H_4N$: C, 48.9; H, 1.8. Found: C, 49.0; H, 2.0.

The corresponding perfluoroheptylbenzonitrile has a boiling point of 254° C.

Reactions similar to those described above give the isomers of perfluoroheptyltoluene, B.P. 217° C.; perfluoropropylnaphthalene, B.P. 104° C. at 12 mm.; perfluoroheptylnaphthalene, an oil; diethyl perfluoroheptylphthalate, an oil; perfluoroheptylphthalic anhydride, M.P. 121–124° C. and perfluoroheptylacetophenone, an oil.

It is understood that the preceding examples are representative and that they may be varied within the scope of the total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing polyfluoroalkyl substituted aromatic compounds which process comprises heating together at a temperature from about 80° C. to about 190° C. (1) a polyfluoroalkyl iodide having the formula $X-R_f-I$, wherein X is selected from the group consisting of fluorine, chlorine, bromine and hydrogen and $R_f$ is a perfluoroalkylene radical, (2) an aromatic compound selected from the group consisting of benzene, naphthalene, anthracene, phenanthrene, diphenyl, chrysene, pyridine, pyrimidine, pyridazine, pyrazine, quinoline, isoquinoline, cinnoline, quinazoline, quinooxaline, phthalazine, and the fused pyridopyridines, said aromatic compound containing from zero to two substituents other than hydrogen and said substituents selected from the group consisting of halogen, hydroxyl, alkoxyl, acyloxy, carboxyl, carboalkoxy, acyl, alkyl, chloroalkyl, bromoalkyl, aryl, cyano, sulfonyl, cyanoalkyl, carboxyalkyl, carboalkoxyalkyl, arylalkyl and sulfonylalkyl, and (3) a free radical generating compound selected from the group consisting of organic peroxides and aliphatic azo compounds; and recovering the product polyfluoroalkyl substituted aromatic compound from the reaction mixture.

2. A process for preparing methyl perfluoroheptylbenzoate which process comprises heating together at a temperature from about 80° C. to about 190° C. 1-iodoperfluoroheptane, methyl benzoate and di-tert-butyl peroxide, and recovering the product methyl perfluoroheptyl benzoate from the reaction mixture.

References Cited by the Examiner

UNITED STATES PATENTS 2,862,974 12/1958 Sieglitz et al. _____ 260—515 X
2,957,031 10/1960 Drysdale _____ 260—612
3,145,222 8/1964 Brace _____ 260—651

OTHER REFERENCES

Foden et al., "J. Am. Pharm. Assoc.," vol. 38 (1949), pp. 570–571.

Lovelace et al., "Aliphatic Fluorine Compounds" (1958), pp. 37–38.

McBee et al., "Chem. Abstracts," vol. 55, p. 10354d, May 1961.

LORRAINE A. WEINBERGER, *Primary Examiner.*

CHARLES B. PARKER, *Examiner.*

R. K. JACKSON, T. L. GALLOWAY,
*Assistant Examiners,*